Jan. 8, 1963 E. ROGAL 3,072,334

REMOTE CONTROLLED ARITHMETIC UNIT USING CODED FREQUENCY INPUTS

Filed Jan. 18, 1961

INVENTOR.

Edward Rogal

BY Morse & Altman

ATTORNEYS 3,072,334

REMOTE CONTROLLED ARITHMETIC UNIT USING CODED FREQUENCY INPUTS

Edward Rogal, Scituate, Mass., assignor to Universal Controls, Inc., New York, N.Y., a corporation of Maryland Filed Jan 18, 1961, Ser. No. 83,551
2 Claims. (Cl. 235—179)

Figures 1, 2:
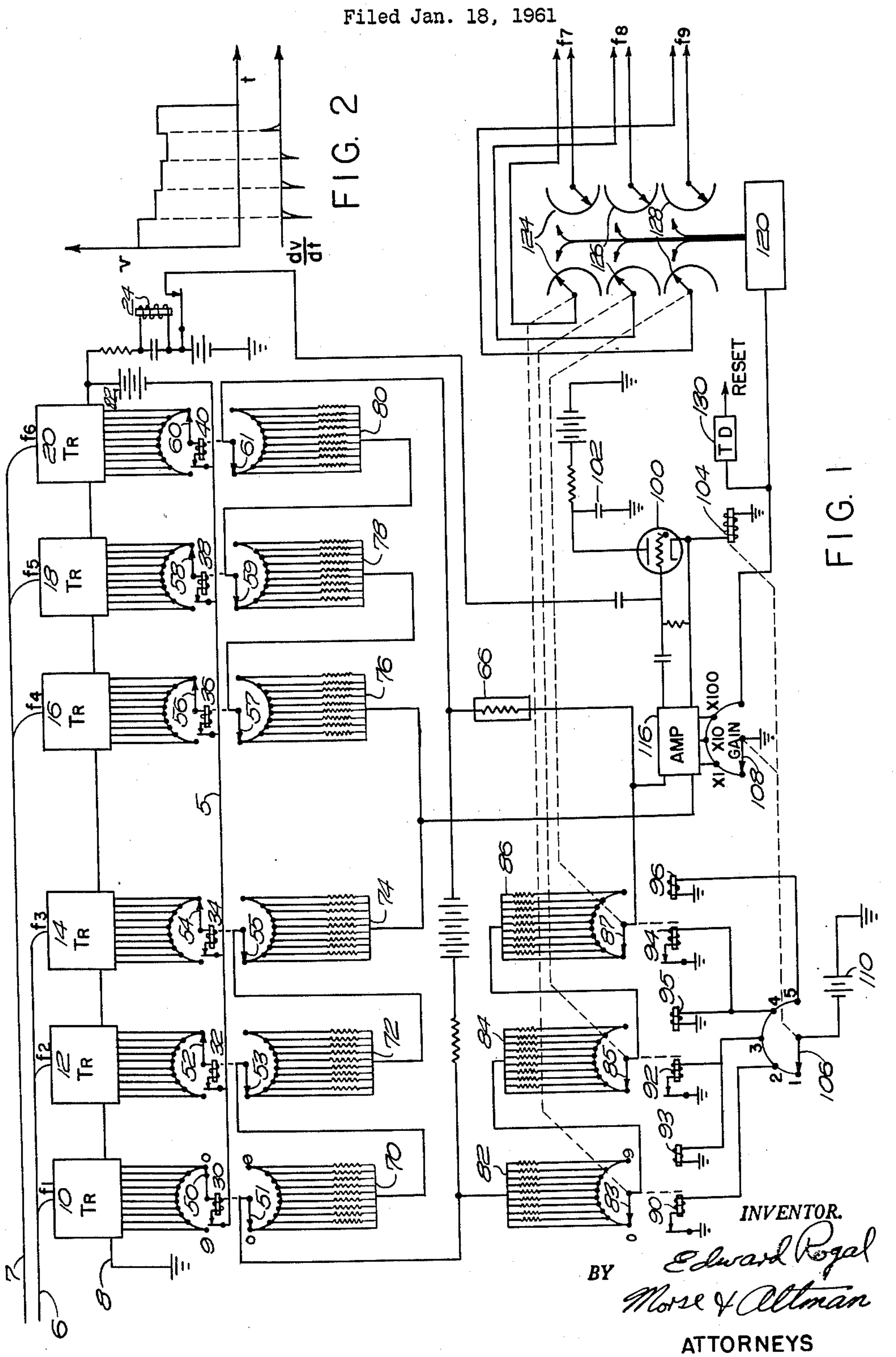

The present invention relates to calculating devices and, more particularly, to data processing by novel electrical circuitry in which input data initially and output data finally are stored as designated positions in multiple position switching that itself participates in the data processing sequence. Such circuitry is particularly useful in the arithmetic units of a remote control accounting system of the type disclosed in copending United States patent application Serial No. 784,913, filed January 5, 1959, in the name of Edward Rogal for Central Office Massive Memory Recording System. In this remote control accounting system, increments of incoming and outgoing information are represented as selected carrier frequencies of a group. The circuitry of the present invention is particularly adapted to receive and transmit such carrier frequencies.

An object of the present invention is to provide, as part of a simple and reliable calculating device, input and output banks of incrementally variable impedance components arranged as arms of a Wheatstone bridge configuration, and controls for switching the input banks to selected impedances representing selected input data and for switching an output bank until bridge balance is achieved in order to determine output data. By virtue of the well known relationships among the arms of a Wheatstone bridge, the input data may be either multiplied or divided and the output data will be either product or quotient. The incrementally variable impedance components, each includes multiple contact means connected to multiple impedances for receiving increments of data, and individual selector means for designating increments of data. Another object of the present invention is to utilize the contact means and selector means of such a device for converting between input and output coded frequencies, by which the device communicates with other components of an accounting system, and elemental electrical signals, by which the device processes data internally.

Other objects of the present invention will in part be obvious and will in part appear hereinafter.

The invention accordingly comprises the apparatus possessing the construction, combination of elements and arrangement of parts which are exemplified in the following detailed disclosure, and the scope of which will be indicated in the appended claims.

For a fuller understanding of the nature and objects of the invention, reference should be had to the following detailed description, taken in connection with the accompanying drawings wherein:

FIGURE 1 is a schematic diagram of an electrical circuit embodying the present invention; and FIG. 2 illustrates certain operating characteristics of the electrical circuit of FIG. 1.

Generally, the embodiment of the present invention herein illustrated comprises, as arms of a Wheatstone bridge, a first bank of incrementally variable impedances for storing representations of digits of a dividend, a second bank of incrementally variable impedances for storing representations of digits of a divisor, a third bank of incrementally variable impedances for storing representations of digits of the quotient and a fourth bank including at least an impedance for standard comparison with selected impedances of the third bank.

The input information is received by the first and second banks in the form of selected carrier frequencies which are distributed to various multiple contacts by a simple network of filters to which all carrier frequencies are applied and by which selected carrier frequencies are distributed. The digital increments of output information are transmitted in the form of multiple carrier frequencies which are supplied to multiple contact means and selected by individual selector means. In the simplest arrangement, distinct carrier frequencies represent distinct input and output digits. The illustrated embodiment for clarity is shown in terms of three digit numbers. It is to be understood, however, that the operational theory herein illustrated is equally applicable to the handling of numbers containing any practical number of digits.

A typical device, embodying the present invention as shown in FIG. 1, operates as follows. A first series of increments of digital information, representing a dividend in the form of selected carrier frequencies $f1$, $f2$ and $f3$, is read into the device via a dividend input lead 6. A second series of increments of digital information, representing a divisor in the form of selected carrier frequencies $f4$, $f5$ and $f6$, is read into the device via a divisor input lead 7. Input leads 6 and 7 connect to a first series of translators 10, 12 and 14 for the dividend and to a second series of translators 16, 18 and 20 for the divisor. These translators, each of which is provided with a relay (not shown), are serially connected into closed circuits by a common grounded bus 8. These translators convert the input coded carrier frequencies into signals that remove ground from selected contact positions of translators 10, 12, 14, 16, 18 and 20, the first and last contact positions of translator 10 being designated 0 and 9, respectively.

When all translators have generated their signals at their selected contact positions, bus 8 is closed to ground. In consequence, battery 22 is applied to a series of stepping magnets 30, 32, 34 for the dividend and a series of stepping magnets 36, 38 and 40 for the divisor. Stepping magnets 30 through 40, in turn, actuate a series of selector blades 50, 52, 54 for the dividend and a series of selector blades 56, 58 and 60 for the divisor. Selector blades 50 through 60 step to the open contact positions of translators 10 through 20 and stop. The closing to ground of common bus 8 also initiates the closing of a time delay relay 24.

Associated with translators 10 through 20 are a first series of decade resistance matrices 70, 72, 74 for the dividend and a second series of decade resistance matrices 76, 78 and 80 for the divisor. The resistors of these matrices present ten sequentially higher values, the first and last resistors of matrix 70 being marked 0 and 9, respectively. A series of resistor selector blades 51, 53, 55 for the dividend and a series of resistance selector blades 57, 59 and 61 for the divisor are actuated by stepping magnets 30, 32 and 34 for the dividend and 36, 38 and 40 for the divisor already described. These resistor selector blades 51 through 61 step in synchronism with selector blades 50 through 60 and stop when selector blades 50 through 60 stop. It will be observed that in so stopping, resistor selector blades 51 through 61 transpose the electrical signals received from translators 10 through 20 into various values of electrical resistance representing the dividend and the divisor numbers.

Decade resistance matrices 70, 72 and 74 constitute the first arm and decade resistance matrices 76, 78 and 80 constitute the second arm of a four arm Wheatstone bridge circuit. A series of decade resistance matrices 82, 84 and 86 for the quotient constitute the third arm. And a standard comparison resistor 66 constitutes the fourth arm. After the dividend and the divisor numbers have been represented as above in terms of selected values of electrical resistance in the first and second arms of the bridge circuit, time delay relay 24 transmits a positive pulse to the grid of a thyratron tube 100. This positive pulse is of sufficient value to elevate tube 100 to its firing potential. In consequence, tube 100 begins to conduct. Next plate capacitor 102 discharges through tube 100 in order to actuate a control relay 104 in the cathode circuit. Control relay 104, in turn, actuates both a control switch 106 and an amplifier switch 108 by stepping the former switch from position 1 to position 2 and by stepping the latter switch from disconnect position to the lowest amplifying state, designated X1. The operation is such that charging of capacitor 102 occurs through resistor 103 sufficiently slowly to permit cutoff of tube 100 following the triggered discharge of capacitor 102 through tube 100.

Then control switch 106 applies battery 110 to a selector relay 90. Selector relay 90 actuates a selector blade 83, which controls decade resistance matrices 82, 84 and 86. Each one of decade resistance matrices 82, 84 and 86 presents ten sequential values of electrical resistance, the first and last resistors of matrix 82 being designated 0 and 9, respectively. The individual resistors of decade resistance matrices 82, 84 and 86 are connected for individual selection with respect to each other and the decade resistance matrices themselves are connected in series between the first and fourth arms of the Wheatstone bridge. Across the junction 101 between the first and second arms and the junction 103 between the third and fourth arms is connected an amplifier 116 in the grid circuit of thyratron tube 100.

As selector blade 83 of decade resistance matrix 82 begins to step from position 0 toward 9, voltage is generated across amplifier 116. This voltage decreases gradually with each progressive step of selector blade 83 toward point 9 until balance is approached. When the balance point is passed, the voltage in the bridge circuit starts to rise. At this moment, selector blade 83 stops as follows. Amplifier 116 transmits an amplified positive signal to the grid of thyratron tube 100. In consequence control relay 104 actuates control switch 106 and amplifier gain switch 108. As a result, control switch 106 steps to position 3 while amplifier switch 108 steps to the next higher amplifying state, designated X10. The gain of amplifier 116 thereby is increased tenfold. Battery 110 now is applied to selector relays 92 and 93. Selector relay 93 steps selector blade 83 back one position from where it stopped when the bridge voltage started to rise. This new position represents for selector blade 83 the point of best balance.

Selector relay 92 now actuates selector blade 85 of decade resistance matrix 84. As selector blade 85 begins to step, voltage again is generated in the bridge circuit. This voltage decreases gradually with each progressive step of selector blade 85 until balance among several resistances is once again approached. When the balance is passed, the voltage in the bridge circuit rises. At this moment, selector blade 85 stops as did selector blade 83 before. The differentiated bridge voltage, now weaker than it was in the previous operation of selector blade 83 is again amplified by amplifier 116. A positive pulse of sufficient value to cause conduction thereby is applied to the grid of thyratron tube 100. Control relay 104 again is actuated so that, in turn, control switch 106 and amplifier switch 108 are actuated. Control switch 106 now steps to position 4 and amplifier switch 108 now moves to the highest amplifying state, designated X100 by which the gain of amplifier 116 again is increased tenfold. Battery 110 now is applied to selector relays 94 and 95. Selector relay 95 steps selector switch 85 back one position from where it stopped when the bridge voltage started to rise. The new position represents for selector blade 85 the point of best balance. Finally switch 87, actuated by selector relay 94, begins to step until it steps one position past the best balance and stops. Amplifier 116 again causes tube 100 to conduct in order to actuate control relay 104. This in turn actuates switches 106 and 108. Switch 106 steps to position 5, applying battery 110 to selector relay 96. Relay 96 steps selector blade 87 back one position to balance, thereby designating the lowest order digit of the quotient. At this point, all of the digits of the quotient have been designated in terms of the positions of selector blades 83, 85 and 87.

At this point, switch 108 has stepped to its final position and now triggers an output frequency generator 120. Frequency generator 120 feeds pairs of read-out switches 124, 126 and 128. Pairs of read-out switches 124, 126 and 128 are ganged to the blades of selector blades 83, 85 and 87. In consequence two carrier frequencies of switches a two-out-of-six frequency for example, code are transmitted as representing the digits of the quotient. Read out occurs at leads marked *f7*, *f8*, *f9*. With the passing of a predetermined time interval, a reset signal that is admitted through the time delay 130 causes all switches to be reset to their original positions.

It will be understood that by rearranging the relationships of the arms, multiplication rather than division may be effected in accordance with the present invention. Since certain other changes may be made in the illustrated device without departing from the scope of the invention herein disclosed, it is intended that all matter contained in the above description or shown in the accompanying drawings shall be interpreted in an illustrative and not in a limiting sense.

What is claimed is:

1. A calculating device comprising a pluraity of first stepping switches, a plurality of second stepping switches and a plurality of third stepping switches, said first stepping switches and said second stepping switches each including a contact element, a series of contact terminals and an electromagnetic drive for stepping said contact element incrementally through said series of contact terminals in response to a series of control signals, first filter means for applying signals to selected contact terminals of said plurality of first stepping switches in response to selected coded signals applied thereto, second filter means for applying signals to selected contact terminals of said pluraity of second stepping switches in response to selected coded signals applied thereto, a first series of banks of incrementally differing impedences for storing representations of first digits, a second series of banks of incrementally differing impedances for storing representations of second digits, a third series of banks of incrementally differing impedances for storing representations of third digits, and a fourth bank including at least a standard impedance, the impedences of each bank being connected at one extremity to each other and being selectively associated to the other extremity with a contact element, the banks of any series being serially connected such that with respect to adjacent banks said one extremity of one of said adjacent banks and said contact element of the other of said adjacent banks are connected, said first bank and said second bank being connected at a first junction, said third bank and said fourth bank being connected at a second junction, said first bank and said third bank being connected at a third junction, said second bank and said fourth bank being connected at a fourth junction, the second and fourth junctions constituting a first pair of terminals, the first and third junctions constituting a second pair of terminals, a source of power across one of the first and second pairs of terminals, indicator means across the other of said first and second pairs of terminals, said contact elements of said first stepping switches being ganged to said contact elements of said first series of banks, said contact elements of said second stepping switches being ganged to said contact elements of said second series of banks, a plurality of output switches each including a selector component and a multiple position component, said selector component being operatively connected to scan said multiple position component for selection among a plurality of coded signals, one each of said elements of said third series of banks being ganged to one each of said selector components of said output switches.

2. The calculating device of claim 1 wherein said indicator means includes a variable gain amplifier, and means for varying the gain of said amplifier as said contact elements of said third series of banks operate.

References Cited in the file of this patent

UNITED STATES PATENTS

| | | |
|---|---|---|
| 2,427,383 | Bryce | Sept. 16, 1947 |
| 2,584,897 | Marco | Feb. 5, 1952 |
| 2,588,923 | Hatton | Mar. 11, 1952 |